Aug. 30, 1960    J. R. HENTZI    2,951,225
MECHANICAL-ELECTRICAL TRANSDUCER
Filed July 21, 1958    2 Sheets-Sheet 1

Aug. 30, 1960  J. R. HENTZI  2,951,225
MECHANICAL-ELECTRICAL TRANSDUCER
Filed July 21, 1958

United States Patent Office 2,951,225
Patented Aug. 30, 1960

2,951,225

MECHANICAL-ELECTRICAL TRANSDUCER

Joffre Robert Hentzi, Waterbury, Conn., assignor to The Bristol Company, Waterbury, Conn., a corporation of Connecticut Filed July 21, 1958, Ser. No. 749,996

5 Claims. (Cl. 338—41)

This invention relates to mechanical motion-conversion means and especially to means for converting linear translatory motion into rotary motion applied to measuring systems of low power and high precision.

A common system for the measurement of physical variables involves an element sensitive to the given variable condition which changes therewith predominantly in a single linear dimension. To accommodate these movements to conventional circular-scale indicators or to certain types of control devices, many types of conversion means have been employed, including linkages, gearing, screws etc. To varying degrees, these prior-art devices exhibit undesirable qualities such as nonlinearity, multiplicity of link and lever members, excessive friction or hysteresis, susceptibility to shock and vibration and also to ambient temperature effects, and inadaptability to miniaturization. The requirements of aircraft instrumentation, for example, have laid particular stress on indicators and transducers in which these undesirable factors are at least minimized and which instruments, furthermore, are of minimum size.

A very useful embodiment of this invention is as a mechanical-electrical transducer. Mechanical-electrical transducers which vary an electrical resistance or the relative apportioning of resistance values in associated parts of an electric circuit have long been in use in electrical measurement of mechanical displacements and, more especially, in the art of telemetering. However, there is an ever increasing need for such a device capable of operating with precision under exceedingly rigorous conditions. This is especially the case in the mobile field where communication between a mobile transmitting station and a fixed receiving station is customarily effected through a radio link. The problems involved will be more readily appreciated when it is understood that such devices are required for use in high-altitude, high-speed aircraft, involving as they do among other things rapid changes in acceleration and altitude together with sustained and intense vibration through a wide range of frequencies. These devices are subjected, also, to rapid and extreme variations of temperature, and it is important that such conditions not adversely affect either the accuracy or the structure of the apparatus. The transducer, therefore, must be light in weight, compact, and rugged, requiring a minimum of space and, at the same time, functioning with the required degree of precision in the face of most unfavorable conditions such as are commonly encountered in such service.

It is, therefore, a principal object of this invention to provide a measuring system in which linear movements of a sensitive element may be translated into angular movements of a registering arm or, conversely, angular movements of a senstive element may be translated into linear movements of a registering arm.

It is a further object of this invention to provide a measuring system of the class described of particular simplicity of design, minimizing effects of nonlinearity, shock, vibration, and temperature.

It is a more specific object of this invention to provide a mechanical-electrical transducer which is simple in construction and to an enhanced degree is free of the effects of nonlinearity, shock, vibration and temperature.

Further objects as well as advantages of the present invention will be apparent from the following description and the accompanying drawings in which Figure 1 is a sectional view of a preferred embodiment of a transducer according to my invention drawn to a much enlarged scale;

Figure 3:
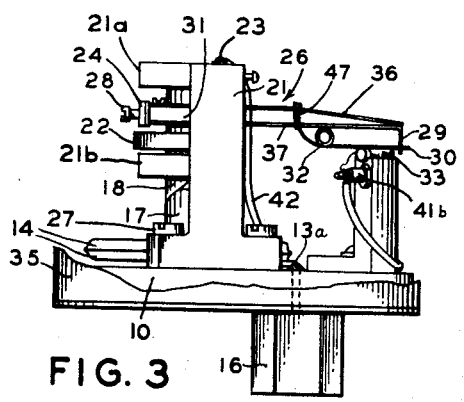
Figures 2 and 3 are a top plan view, with cover removed, and a side elevational view, with cover partly cut away, respectively, of the embodiment of Figure 1 drawn to a smaller scale.
Figure 2:
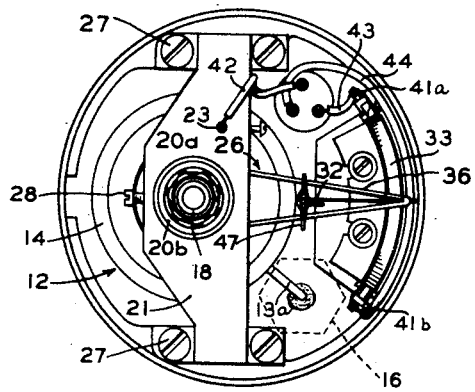

Referring first to Figures 1, 2, 3 and 6, base member 10 serves to provide a unitary mounting for the structure. Pressure responsive means in the form of a bellows element or flexible diaphragm assembly 12 is formed with an end fitting 13 soldered, welded or otherwise attached to the flexible diaphragm assembly 12 on one face thereof and adapted to fit into a socket 11 formed on the base member 10 in which the end fitting 13 is retained by set screw 15. Copper tubing 13a soldered into end fitting 13 communicates with screw fitting 16 (Figure 3) integral with base 10 whereby connection can be made to an external source of pressure (not shown) to be measured. As shown, the sensitive pressure element 12 consists of two conventional corrugated diaphragms 14 joined at their outer peripheries to form a capsular element whose resilient walls are free to expand linearly under the influence of internal pressure. Though here only one capsular element is illustrated, it is of course to be understood that two or more elements may be mounted in a series arrangement by joining adjacent capsular elements axially by a hollow rigid coupling member. The upper or free face of the diaphragm assembly 12 is attached to an axially extending cylindrical cam member 17 to which is thereby imparted linear movements of the pressure element 12. Coacting with cam member 17 but capable of rotary motion in a manner hereinafter to be described is a cam follower member 18. Said last-named member may also be cylindrical in construction and of extended length so as to pass through two spaced apart bearing members, 19 and 20, which preferably are as shown, of the miniature ball-bearing type. The inner races 19a and 20a of the bearing members are fixed to the cam follower member 18, and the outer races 19b, 20b are fixed to a supporting frame 21. As shown, supporting frame 21 is a casting generally in the form of an inverted U, the free ends of its legs being fixed to base 10 by bolts 27. The transverse portion of this U provides one support plate 21a and a second support plate 21b is supported between the legs of frame 21 in parallel spaced relation with plate 21a. Outer races 20b and 19b are fixed respectively in apertures formed respectively in plates 21a, 21b. Thus, axial motion of the cam follower 18 along the perpendicular axis of the assembly is prevented but radial motion about this axis is facilitated.

A phosphor-bronze coil spring 22 is attached at its outer end to the supporting frame 21 by means of a post 23 and, at its inner end to an indicator assembly 26 through a soldering stud 25. This spring produces a biasing torque in a direction to keep the cam and follower members in contact. The inner end of the spring 22 also provides electrical connection to a movable indicator assembly 26.

Figure 1:
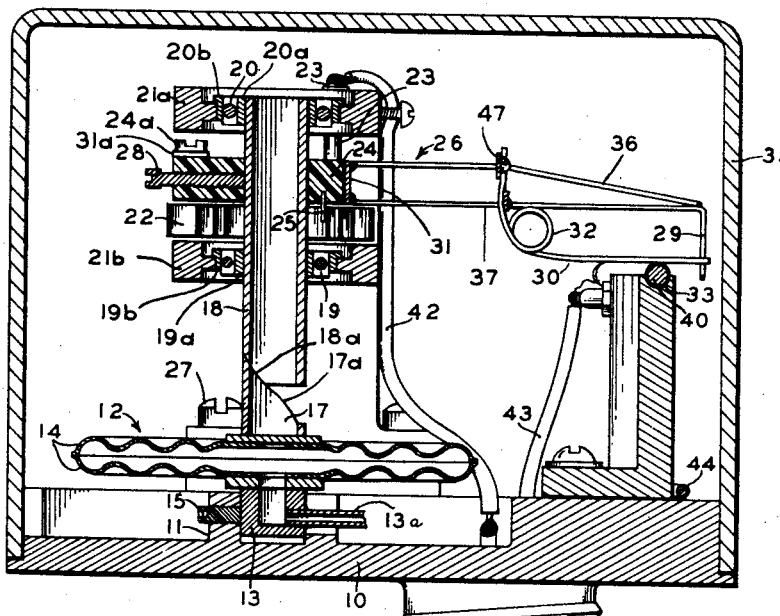
Figure 6:
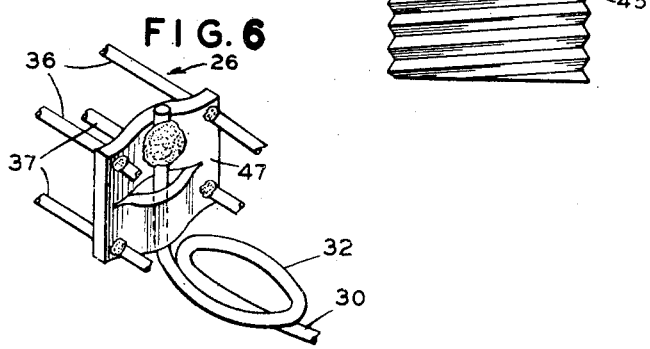
Figure 6 is a fragmentary perspective view of the connection provided between the contact brush and its support.

This indicator assembly 26 comprises a block 24 of an insulating material, such as nylon, drilled to embrace the cam follower member 18, spaced between the bearings 19 and 20, and having a set screw 28 whereby to be fixed to said cam follower. Light, resilient, conductive wire loops 36 and 37 are supported in spaced relation one above the other on a conductive support member 31 having a generally U-shape and having tabs 31a, one of which is shown in Figure 1, secured to block 24 by screws 24a. The stud is conductively soldered to a tab which extends downwardly from support member 31. The two strands of wire forming the two loops 36 and 37 are each threaded through holes formed in the corners of a plate 47 and are there soldered in place. Plate 47 has a central aperture formed therethrough and as is most clearly shown in Figure 6, the upper and lower central portions thereof are bent in opposite directions to provide a passageway for one end of a wire contact brush 30. Plate 47 serves to rigidify the two wire loops 36 and 37 and in addition the three ends of loops 36 and 37 may be joined by solder. Wire 30 has a loop or coil 32 formed therein whence a biasing force is provided to an extended portion thereof which makes contact with a resistance element 33. Furthermore, this contact wire extends within a guide loop 29 formed at the end of the lower loop 37 and extending normal to the path followed by brush 30 along resistance element 33 whereby angular movements of the indicator arm are exactly communicated to the contact wire but other movements of the arm, generally in the plane perpendicular to the plane of normal rotation, such as occur under the influence of shock or vibration on the loops 36, 37 are not transferred to the contact wire 30. Contact wire 30 as well as wire loops 36, 37 have a mass which is small compared to the remainder of the assembly.

The resistance element 33 may, for example, be constructed according to the principles of the co-pending patent application of John L. Russell, filed June 1, 1954, Serial No. 433,491 and assigned to the assignee of the present application. Thus, resistance wire 33 is wound upon an aluminum core 40 and formed to a substantially circular curvature having a relatively heavy layer of oxide electrolytically deposited thereon. The spacing of the convolutions of the winding 33 is made slightly greater than the wire diameter so that adjacent turns are separated by spacing of, say, 0.0005 to 0.001 inch. The extremities of the winding 33 may be directly connected to any suitable terminal posts, as 41a and 41b these together with brush terminal 23 are connected by insulated leads, 42, 43 and 44 respectively to a conventional electrical connector unit 45 to provide desired electrical connection to external circuit associated with the transducer.

The whole assembly may be suitably enclosed by a formed cover member 35.

The principle of operation of the conversion mechanism may be conveniently illustrated by reference to Figure 4. Here, the two parts 17 and 18 of the motion-conversion means are shown separated. The lower or cam member 17 is attached to the bellows element and provides linear movement along the vertical axis. It is cylindrical in shape and with a helically formed edge 17a forming a cam. The upper element, or cam-follower member 18, is also of cylindrical shape and is formed with a cylindrical edge portion 18a adapted to make engagement with the corresponding helical edge of the lower cam element. Coiled spring 22, attached to member 18 exerts a force tending to keep the cam follower member 18 always in positive contact with the cam member 17. Now it will be apparent that linear movements of the cam member will cause the follower member to slide upon the conformed surfaces and, thus, when restrained from axial translatory motion, said follower moves angularly about the common axis. With the two members maintained so that the juxtaposed surfaces are always in contact, it may be noted that either the linearly-moving element or the angularly-moving element may act as the source of independent motion and the positioning of the one will produce a unique position of the other. Furthermore, because the conformed surfaces are helical, the dependent variable is linearly proportional to the independent variable. Variations from the helical form of outline of the cam surfaces is of course possible if some non-linear relation between input and output is desired. In the general helical case, however, the range of motion is determined by the diameter of the cam elements and the helix angle. In practice, there are limits to the value of helix angle which can be employed because with too low values of helix angle excessive friction makes the device practically useless for the purpose contemplated herein. In the embodiment hereinbefore disclosed a desirable range of helix angle values ranges from about 30° to 50°. Within that range, the values of the dependent variable in this case represented by translation of the angularly moving member, for a given value of the linear independent motion, are inversely proportional to the helix angle.

Figure 5:
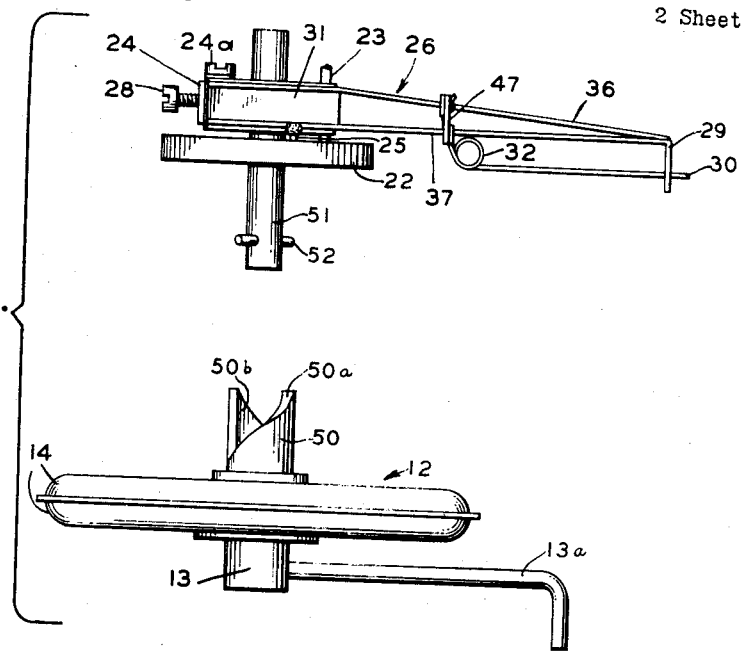
Figure 5 is an exploded view of a modified form of motion-converting means in accordance with my invention.
Figure 4:
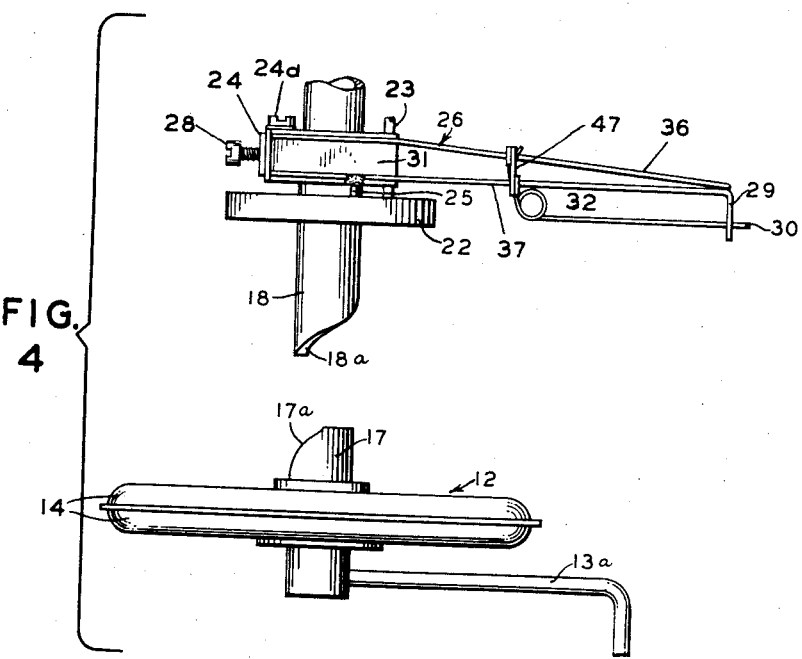
Figure 4 is an exploded view of the motion-converting means shown in Figures 1 to 3.

A modification of the embodiment of Figure 4 is shown in Figure 5. In this, the surface-to-surface contact between the cam and follower members 17, 18 of Figure 4 is replaced by a line-to-surface contact for the purpose of further reducing friction between the two members. The upper edge of the cylindrical cam member 50 is formed of the two identical curved surfaces 50a and 50b displaced 180°. For linearly proportional conversion of motion these surfaces are of strictly helical form. Cam follower member 51 is in the form of a cylindrical shaft in the lower end of which a steel pin 52 of relatively small diameter is fixed perpendicularly to the axis and extending diametrically so that its ends engage simultaneously the two matched spirals 50a and 50b of the cam member 50. Also, the cam member may comprise a single spiral surface and, correspondingly, a single pin follower may extend radially from the upper, rotary member 51. In either case, details of structure and operation conform to the description made of the embodiment described in connection with Figures 1–4.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A mechanical-electrical transducer, comprising a base; a conductive resistor insulatively mounted on said base and presenting an elongated conductive surface, sensing means mounted on said base and including a linearly movable element adapted for displacement in proportion to changes in the value of a variable quantity, an elongated cam member connected to and axially movable with said element, said cam member having an axially presented helical cam surface formed therealong adjacent to an end thereof, an elongated cam follower having an axially presented helical surface complementary to and in juxtaposition with said helical surface on said cam member, means rotatably supporting said cam follower in axial alignment with said cam member and maintaining said cam follower axially immovable, resilient means biasing said cam follower to rotate the same in a direction to maintain its helical surface in engagement with the helical surface on said cam member, contact brush means insulatively mounted on and rotatable with said cam follower, said contact brush means including a contact member engaging and movable along said surface of said resistor, and circuit means connected to said contact member and to said resistor.

2. A mechanical-electrical transducer, comprising a base, a conductive resistor insulatively mounted on said base and presenting an elongated conductive surface, sensing means mounted on said base and including a linearly movable element adapted for displacement in proportion to changes in the value of a variable quantity, an elongated cam member connected to and axially movable with said element, said cam member having an axially presented helical cam surface formed therealong adjacent to an end thereof, an elongated cam follower, a transversely extending member disposed on said cam follower, means rotatably supporting said cam follower in axial alignment with said cam member and maintaining said cam follower axially immovable, said transversely extending member being in juxtaposition with said helical surface on said cam member, resilient means biasing said cam follower to rotate the same in a direction to maintain said transverse member in engagement with the helical surface on said cam member, contact brush means insulatively mounted on and rotatable with said cam follower, said contact brush means including a contact member engaging and movable along said surface of said resistor, and circuit means connected to said contact member and to said resistor.

3. A mechanical-electrical transducer, comprising a base, a conductive resistor insulatively mounted on said base and presenting an elongated conductive surface, sensing means mounted on said base and including a linearly movable element adapted for displacement in proportion to changes in the value of a variable quantity, an elongated cam member connected to and axially movable with said element, said cam member having an axially presented helical cam surface formed therealong adjacent to an end thereof, an elongated cam follower having an axially presented helical surface complementary to and in juxtaposition with said helical surface on said cam member, means rotatably supporting said cam follower in axial alignment with said cam member and maintaining said cam follower axially immovable, resilient means biasing said cam follower to rotate the same in a direction to maintain its helical surface in engagement with the helical surface on said cam member, an insulative block fixed to and movable with said cam follower, a pair of resilient conductive loops fixed in spaced relation to said block and having free ends thereof extending towards said resistor, an elongated resilient contact brush member conductively connected to said loops and having a free end portion self-biased against the surface of said resistor, and circuit means connected to at least one of said loops and to said resistor.

4. A mechanical-electrical transducer, comprising a base, a conductive resistor insulatively mounted on said base and presenting an elongated conductive surface, sensing means mounted on said base and including a linearly movable element adapted for displacement in proportion to changes in the value of a variable quantity, an elongated cam member connected to and axially movable with said element, said cam member having an axially presented helical cam surface formed therealong adjacent to an end thereof, an elongated cam follower having an axially presented helical surface complementary to and in juxtaposition with said helical surface on said cam member, means rotatably supporting said cam follower in axial alignment with said cam member and maintaining said cam follower axially immovable, conductive resilient means biasing said cam follower to rotate the same in direction to maintain its helical surface in engagement with the helical surface on said cam member, an insulative block fixed to and movable with said cam follower, a pair of resilient conductive wire loops fixed in spaced relation to said block and having free ends thereof extending towards said resistor, the free end of one of said loops being curved and defining a slot extending normal to said resistor surface, an elongated resilient contact brush member conductively connected to said loops and having a free end portion extending through said slot and self-biased against said resistor surface, means conductively connecting said resilient means to at least said one loop, and circuit means connected to said resilient means and to said resistor.

5. A mechanical-electrical transducer, comprising a base, a conductive resistor insulatively mounted on said base and presenting an elongated conductive surface, sensing means mounted on said base and including a linearly movable element adapted for displacement in proportion to changes in the value of a variable quantity, an elongated cam member connected to and axially movable with said element, said cam member having axially presented spaced helical cam surfaces formed therealong adjacent to an end thereof, an elongated cam follower, a transversely extending member disposed on said cam follower, means rotatably supporting said cam follower in axial alignment with said cam member and maintaining said cam follower axially immovable, said transversely extending member being in juxtaposition with said helical surfaces on said cam member, conductive resilient means biasing said cam follower to rotate the same in a direction to maintain said transversely extending member in engagement with the helical surface on said cam member, an insulative block fixed to and movable with said cam follower, a pair of resilient conductive wire loops fixed in spaced relation to said block and having free ends thereof extending towards said resistor, the free end of one of said loops defining a slot extending normal to said resistor surface, an elongated resilient contact brush member conductively connected to said loops and having a free end portion extending through said slot and self-biased against said resistor surface, means conductively connecting said resilient means to at least said one loop, and circuit means connected to said resilient means and to said resistor.

References Cited in the file of this patent

UNITED STATES PATENTS

| | | |
|---|---|---|
| 495,656 | Beekman | Apr. 18, 1893 |
| 2,232,360 | Barnett | Feb. 18, 1941 |
| 2,252,251 | Cooper | Aug. 12, 1941 |
| 2,379,328 | Weingart | June 26, 1945 |
| 2,485,433 | Crum | Oct. 18, 1949 |
| 2,611,847 | Scott | Sept. 23, 1952 |